(12) United States Patent
Deponte et al.

(10) Patent No.: US 9,799,911 B2
(45) Date of Patent: Oct. 24, 2017

(54) BATTERY CELL COMPRISING A CURRENT COLLECTOR FOR MAKING CONTACT WITH A HOUSING

(71) Applicant: Robert Bosch GmbH, Stuttgart (DE)

(72) Inventors: Rene Deponte, Sersheim (DE); Markus Feigl, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/431,003

(22) PCT Filed: Jul. 31, 2013

(86) PCT No.: PCT/EP2013/066062
§ 371 (c)(1),
(2) Date: Mar. 25, 2015

(87) PCT Pub. No.: WO2014/048618
PCT Pub. Date: Apr. 3, 2014

(65) Prior Publication Data
US 2015/0280274 A1    Oct. 1, 2015

(30) Foreign Application Priority Data

Sep. 26, 2012    (DE) .......................... 10 2012 217 478

(51) Int. Cl.
*H01M 10/052* (2010.01)
*H01M 10/04* (2006.01)
(Continued)

(52) U.S. Cl.
CPC ..... *H01M 10/0431* (2013.01); *H01M 2/0237* (2013.01); *H01M 2/043* (2013.01);
(Continued)

(58) Field of Classification Search
CPC ... H01M 10/0525; H01M 10/052; H01M 2/30
See application file for complete search history.

(56) References Cited

U.S. PATENT DOCUMENTS

2004/0023107 A1    2/2004  Nakanishi et al.
2004/0237290 A1*  12/2004  Ura .................. H01M 2/263
                                              29/623.1
(Continued)

FOREIGN PATENT DOCUMENTS

| CN | 1776952 A | 5/2006 |
|---|---|---|
| CN | 101834303 A | 9/2010 |
| EP | 2293366 | 3/2011 |
| EP | 2515363 | 10/2012 |
| JP | S58107456 A | 6/1983 |
| JP | 2005216825 A | 8/2005 |

OTHER PUBLICATIONS

International Search Report for Application No. PCT/EP2013/066062 dated Jan. 29, 2014 (English Translation, 6 pages).

*Primary Examiner* — Olatunji Godo
(74) *Attorney, Agent, or Firm* — Michael Best & Friedrich LLP

(57) ABSTRACT

The invention relates to a battery cell, in particular a lithium-ion battery cell, wherein compared to conventional battery cells, a number of components can be reduced. The battery cell has at least one winding element, two current collectors each electrically connected to one of the electrodes of the winding element, and a metal housing. In order to be able to establish an electrical contact between one of the electrodes of the winding element and the housing, one of the current collectors is specifically configured and arranged such that said current collector is in direct mechanical and electrically conductive contact with the housing. To this end, said housing contact current collector (29) can be provided with a suitably wide plate-shaped area (35), which in edge regions (37) that are bent away at a right angle can rest against an interior wall of the housing of the battery cell in a planar manner, and can establish an electrical contact therewith.

19 Claims, 3 Drawing Sheets

(51) Int. Cl.
*H01M 2/26* (2006.01)
*H01M 4/66* (2006.01)
*H01M 10/0525* (2010.01)
*H01M 2/06* (2006.01)
*H01M 2/02* (2006.01)
*H01M 2/04* (2006.01)

(52) U.S. Cl.
CPC ............ *H01M 2/06* (2013.01); *H01M 2/263* (2013.01); *H01M 4/661* (2013.01); *H01M 10/0525* (2013.01); *H01M 2/0217* (2013.01); *H01M 2/0285* (2013.01); *H01M 2/0486* (2013.01); *H01M 2220/20* (2013.01); *Y02E 60/122* (2013.01)

(56) References Cited

U.S. PATENT DOCUMENTS

| | | | |
|---|---|---|---|
| 2009/0136835 A1* | 5/2009 | Nakai | H01M 2/263 429/129 |
| 2010/0310922 A1* | 12/2010 | Villarreal | H01M 2/1077 429/160 |
| 2011/0129706 A1 | 6/2011 | Takahashi et al. | |
| 2011/0305928 A1* | 12/2011 | Kim | H01M 10/0431 429/61 |
| 2012/0148908 A1* | 6/2012 | Ito | H01M 2/30 429/179 |
| 2015/0255762 A1* | 9/2015 | Feigl | H01M 2/0426 429/94 |

* cited by examiner

BATTERY CELL COMPRISING A CURRENT COLLECTOR FOR MAKING CONTACT WITH A HOUSING

BACKGROUND OF THE INVENTION

The present invention relates to a battery cell, in particular a lithium-ion battery cell. In addition, the invention relates to a motor vehicle comprising such a battery cell.

Battery cells, sometimes also referred to as rechargeable battery cells, are used for the chemical storage of energy provided electrically. Battery cells are already used nowadays for supplying energy to a large number of mobile devices. In the future, battery cells are intended to be used, inter alia, for supplying energy to mobile electric vehicles or hybrid vehicles, on land and in water, or for the stationary buffer-storage of electrical energy originating from alternative energy sources.

For this purpose, a large number of battery cells is usually assembled to form battery packs. In order to make as efficient use as possible of a pack volume available, primarily battery cells with a prismatic, for example right-parallelepipedal form, are used for such purposes.

Owing to its possible high energy density, thermal stability and lack of memory effect, a lithium-ion rechargeable battery technology, which is being developed intensively at present owing to the high economic significance of future electromobility, is usually used for demanding applications such as storage solutions for motor vehicles, for example.

Already many different types of battery cells, in particular lithium-ion battery cells, and in addition in particular battery cells with a prismatic form are in existence. However, such conventional battery cells usually have a complex design, in which a large number of different individual parts is used for assembly of the entire battery cell. Such a large number of individual parts with different forms, functions and comprising different materials requires the use of a wide variety of manufacturing technologies and equipment. In addition, the large number of different individual component parts always needs to be available in its entirely during manufacture of the battery cell, which requires coordination in the manufacture of individual component parts and suitable stock provisions. All this can contribute to increased costs in the manufacture of the battery cell.

SUMMARY OF THE INVENTION

The number of individual component parts required for the assembly of a battery cell can be reduced, inter alia, with the aid of embodiments of the present invention.

The invention proposes a battery cell, in particular a lithium-ion battery cell, which has at least one coil element, one electrolyte, two current collectors and a housing. The coil element comprises a wound stack comprising a copper film, coated with anode material, an aluminum film, coated with cathode material, and two plastic films acting as diaphragms. One of the current collectors comprises copper and is electrically conductively connected, for example welded, to the copper film of the coil element. The second current collector comprises aluminum and is electrically conductively connected to the aluminum film of the coil element. The housing has a metallic container and a metallic cover arrangement. The container has an opening, through which the coil element and the two current collectors can be introduced into the housing during manufacture of the battery cell. The cover arrangement is designed to seal off the opening of the container in a gas-tight and pressure-tight manner. A leadthrough arrangement is formed on the cover arrangement in order to pass electrically conductive contact arrangements, which are each in contact with one of the current collectors in the interior of the housing, out of the housing through the cover arrangement. The proposed battery cell in this case is characterized by the fact that one of the current collectors is designed and arranged in such a way that it is in direct mechanical and electrically conductive contact with the housing. This current collector is referred to as the housing contact current collector.

Embodiments of the battery cell according to the invention are based, inter alia, on the following concepts and findings:

In battery cells, the coil element with its stack of different metal films and diaphragms therebetween is used, together with the electrolyte wetting this stack, for the chemical storage of energy, wherein the chemically stored energy can be provided in the form of electrical energy by suitable chemical reactions at the electrodes.

Current collectors serve the purpose of producing an electrical contact between the electrodes of the coil element and a contact arrangement which can be passed out of the housing of the battery cell and with which contact can be made from the outside. For this purpose, in each case one current collector is fitted, preferably welded, to one of the metal films of the coil element. In order to avoid contact potential differences between a current collector and a metal film of the coil element fitted thereto and, resulting from this, a reduction in the efficiency of the battery cell, a current collector should preferably consist of the same metal as the metal film with which it is in contact. Since the metal films used in the coil element need to consist of different metals in order to be able to perform their function as anode or as cathode for the battery cell, therefore, the two current collectors provided in the battery cell should also consist of different metals. It is therefore necessary or at least advantageous in the manufacture of battery cells to provide two different types of current collectors, which differ at least in respect of the material used.

It has furthermore been observed that it may be advantageous in battery cells for the metal housing to be connected to an identical electrical potential to one of the electrodes of the coil element accommodated therein. In order to achieve this, additional component parts are usually used in conventional battery cells, said additional component parts intending to ensure an electrical connection between the contact arrangement path through the cover arrangement and the metal cover arrangement. Since it is necessary to ensure in the process that electrical contact is produced with only one of the electrodes of the coil element toward the cover arrangement and therefore toward the housing which is in electrical contact with this cover arrangement in order to avoid a short circuit of the battery cell, suitable precautions need to be taken. In particular, the two contact arrangements, which are each in contact with a current collector accommodated in the interior of the housing, need to either have a different design or different additional component parts need to be provided in order to ensure that only one of the two contact arrangements comes into electrical contact with the cover arrangement or the housing. This means that a large number of different component parts needs to be provided.

Against the background of that explained above, it has now been identified that the two current collectors of the battery cell in any case need to be provided in two different configurations, whereas other components of the battery cell, such as in particular the contact arrangements thereof, which are not in direct contact with the electrolyte, could in principle be manufactured from the same material, with the result that different component parts would not absolutely have to be stocked for these components.

It is therefore proposed that the current collectors of the battery cell are configured suitably so that an electrical contact is established between the housing and one of the electrodes with the aid of one of the current collectors. For this purpose, one of the current collectors is in the form of a housing contact current collector and is matched in terms of its form such that, when the battery cell is completely assembled, a mechanical and electrically conductive contact is produced between the current collector and the housing. The other current collector is designed in such a way that no such mechanical and electrically conductive contact with the housing is produced. Accordingly, with the two current collectors to be provided as different component parts, it is already possible to achieve a situation whereby the housing of the battery cell is connected to the electrical potential of one of the electrodes of the coil element without further component parts needing to be provided for this purpose.

Preferably, the housing contact current collector is designed in such a way that it comes into direct mechanical and electrically conductive contact with the container. In addition, the housing contact current collector is preferably designed in such a way that it does not come into mechanical and electrically conductive contact with the cover arrangement. Since the container and the cover arrangement are generally in electrical contact with one another in any case when the battery cell is completely assembled, it is sufficient for contact to be produced with one of the inner electrodes of the coil element for one of these two components. In this case, an electrical contact can be realized with the aid of the housing contact current collector usually more easily with the container than with the cover arrangement. In addition, when the container is still open, it is possible to visually check whether the housing contact current collector is fitted correctly and is producing the desired contact with the container, whereas, in the case of a housing contact current collector which would produce a contact with a cover arrangement, such a check is no longer possible, at least visually, as soon as the cover arrangement closes the housing.

In an advantageous configuration, the housing contact current collector has a plate-shaped region, which extends parallel to the cover arrangement and which is in mechanical and electrically conductive contact at its rim with an inner surface of the container. In general, current collectors of a battery cell often have an L shape, in which a long limb runs in the longitudinal direction of the battery cell, i.e. parallel to a side wall of the housing of the battery cell, and is welded to one of the metal films of the coil element, whereas a shorter limb extends transversely thereto and parallel to the cover arrangement. Contact is usually made with the shorter limb in this case by the contact arrangement which is passed through the cover arrangement toward the outside. In this case, the current collector can be bent easily out of a metal sheet, for example, and can therefore be integral. The shorter limb of the current collector can in this case be formed easily in a suitable manner with a plate-shaped region so that, when the battery cell is assembled, it mechanically abuts the housing, preferably the container, and produces an electrical contact therewith.

A width of the plate-shaped region of the housing contact current collector can in this case preferably be dimensioned such that it corresponds to a width between two opposite inner walls of the container. As a result, the housing contact current collector comes into contact with the inner wall of the housing with its rims when installed in the housing and in the process is supported on the two opposite inner walls of the container.

In this case, a peripheral region of the plate-shaped region of the housing contact current collector can be bent back in a direction parallel to a side wall of the container. Such bending can take place, for example, at an angle of 90°. By virtue of the bent-back peripheral region, it is possible to achieve a situation whereby the plate-shaped region of the housing contact current collector does not abut against the housing with a sharp edge of the sheet forming said housing contact current collector, but rather the bent-back peripheral region rests on the housing over a large area. As a result, local excessive surface pressures can be avoided. In particular when both the housing and the current collectors are formed from a metal sheet and the metal sheet of the housing contact current collector has a different thickness than the metal sheet of the housing and therefore also a different mechanical stability, damage to the housing contact current collector and/or the housing owing to excessive surface pressure can be avoided by virtue of a suitable formation of the peripheral region of the plate-shaped region of the housing contact current collector.

The described features of the battery cell and configurations of the components in the battery cell, in particular the current collectors, are suitable in particular for use in battery cells whose housing has a prismatic form.

It will be mentioned that possible features and advantages of a battery cell according to the invention are described herein with reference to different embodiments. A person skilled in the art will understand that the individual features can be combined in a suitable manner with one another or replaced by one another in order to arrive in this way at further embodiments and possible synergy effects.

BRIEF DESCRIPTION OF THE DRAWINGS

Embodiments of the present invention will be described below with reference to the attached drawings, wherein neither the description nor the drawings should be interpreted as being restrictive to the invention.

The figures are merely schematic and are not true to scale. Identical reference symbols in the figures denote identical or functionally identical features.

DETAILED DESCRIPTION

Figure 1:
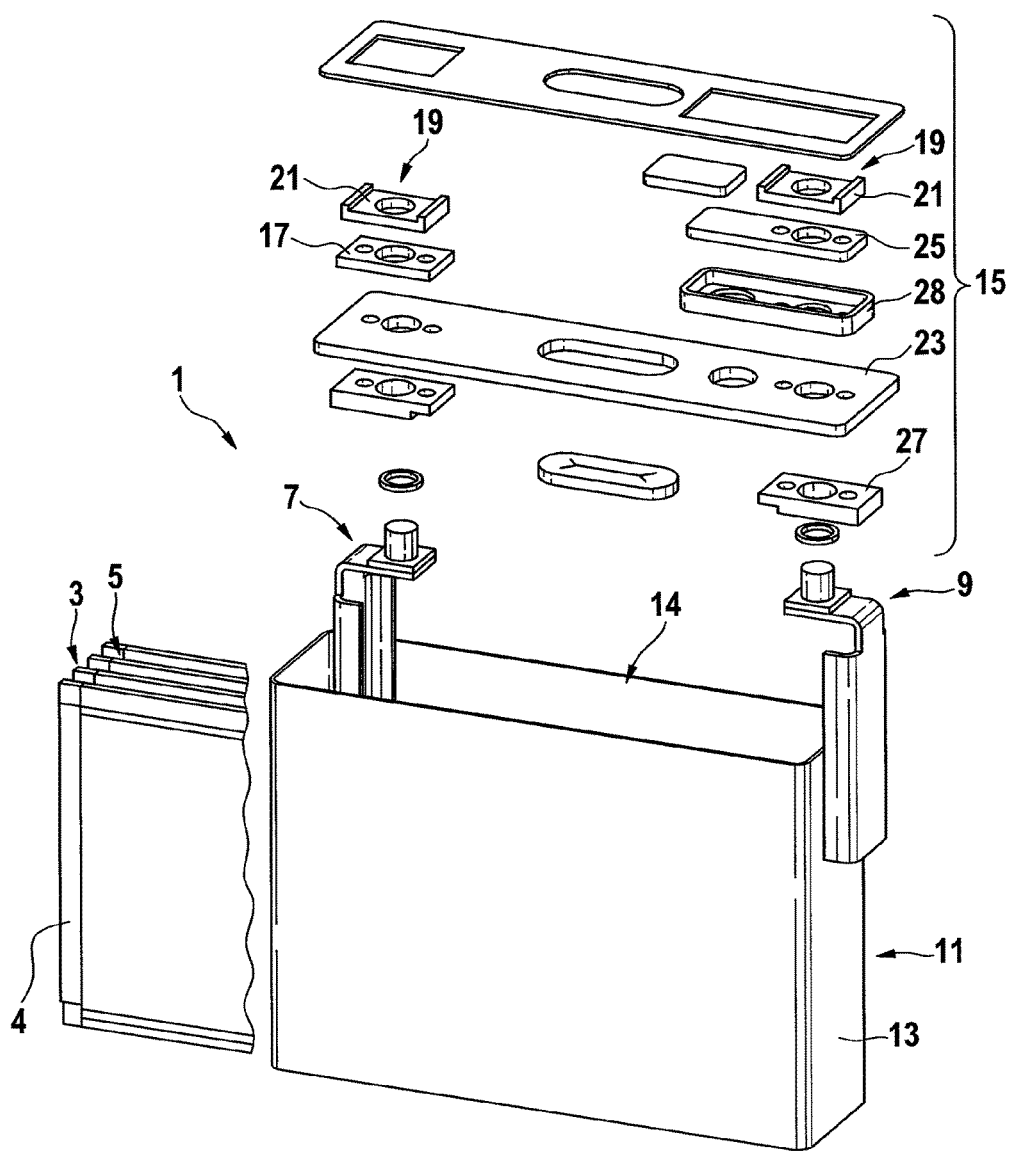
FIG. 1 shows an exploded drawing of a lithium-ion battery cell.

FIG. 1 shows a conventional lithium-ion battery cell in an exploded view. It can be seen that the battery cell comprises a large number of individual components, which are provided separately and need to be assembled in a complex manner during manufacture. In this text only the component parts which are necessary for the understanding of embodiments of the invention and features thereof will be described, and no description will be given of the remaining component parts of the battery cell.

The battery cell 1 has a coil element 3 comprising a coiled stack 5 comprising a copper film, which is coated with anode material, and an aluminum film, which is coated with cathode material, and plastic films therebetween, which act as diaphragms.

In order to make electrical contact, the copper film and the aluminum film are stacked one on top of the other with a slight offset with respect to one another along the winding axis in opposite direction so that the copper film on one narrow side and the aluminum film on an opposite narrow side protrude slightly beyond a respective rim of the coil element. A current collector 7 comprising copper is welded to a protruding region 4 of the copper film so that this current collector is electrically connected to the anode of the coil element. A second current collector 9 comprising aluminum is welded to an opposite protruding region of the aluminum film in order to produce an electrical contact with the cathode of the coil element 3.

The coil element 3 provided with the two current collectors 7, 9 is then introduced into a right-parallelepipedal container 13, which is open at the top, through an opening 14. At a later point in time, a liquid electrolyte is introduced into the container 13, said electrolyte therefore coming into contact with the anode and cathode materials provided on the metal films of the coil element so that desired chemical reactions between these materials and the electrolyte and correspondingly conversion of chemical energy into electrical energy, and vice versa, can take place at the interfaces. The container 13 is formed from a metal sheet in order to be able to withstand the chemically aggressive electrolyte, inter alia.

The opening 14 of the container 13 is closed in a gas-tight and pressure-tight manner with the aid of a cover arrangement 15. In this case, the cover arrangement 15 has a large number of component parts in order to be able firstly to allow contact arrangements 19 to be able to reach through the cover arrangement 15 and secondly to enable the cover arrangement 15, including the contact arrangements 19 provided therein, to close off the opening 14 of the container 13 in a seal tight manner to a sufficient extent in order to reliably prevent electrolyte from emerging or the ingress of moisture.

The contact arrangements 19 in this case serve the purpose of producing an electrical contact between outer connections 21 and the current collectors 7, 9 arranged in the interior of the housing 11. In order to be able to connect the housing 11 to an identical electrical potential to that of one of the current collectors 7, 9, in conventional battery cells the two contact arrangements 19 are provided with a plurality of differing individual component parts. For example, an electrically conductive potential plate 17 is provided on one of the contact arrangements 19, which potential plate produces an electrical contact between the contact element 21 and a metallic covering plate 23 welded to the container 13. In the case of the other contact arrangement 19, an electrically insulating component part 28 is provided instead in order to prevent electrical contact between the assigned current collector 9 or the contact arrangement 19 in contact therewith, on the one hand, and the covering plate 23 on the other hand.

Figure 2:
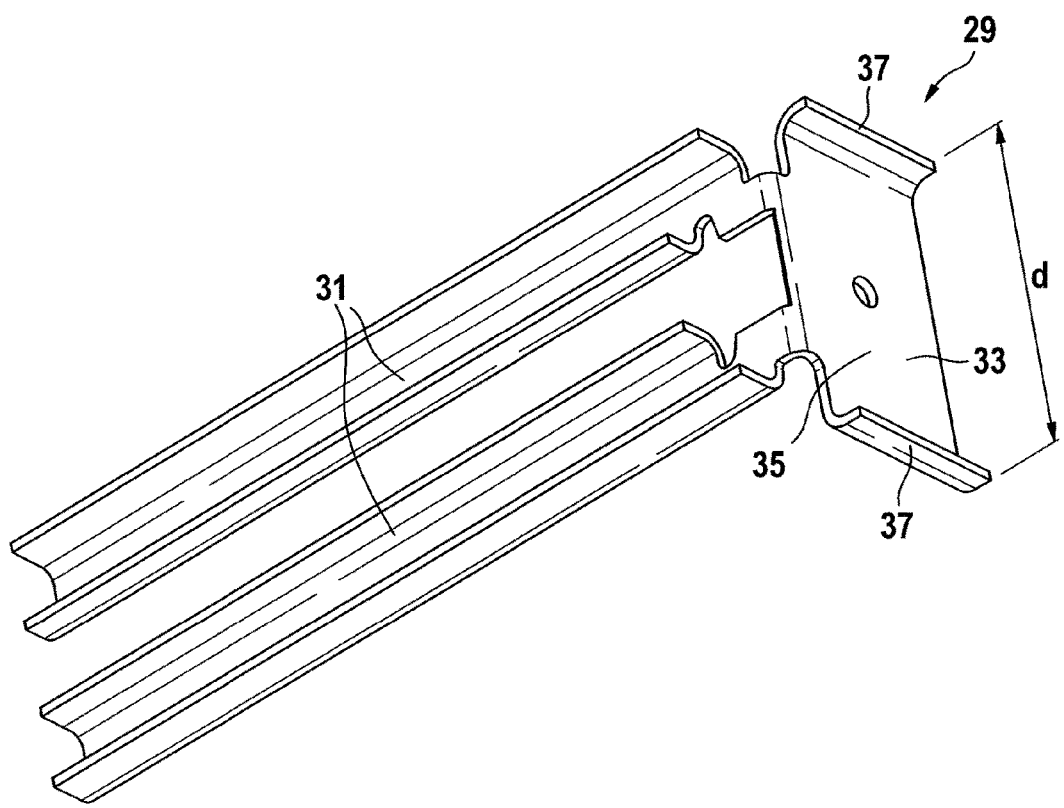
FIG. 2 shows a perspective view of a housing contact current collector for a battery cell in accordance with one embodiment of the present invention.

In order to be able to avoid the described necessity for a large number of individual component parts for the contact arrangement, the invention now proposes designing one of the two current collectors 7, 9 specifically as housing contact current collector 29, as is illustrated by way of example in FIG. 2. In addition to two limbs 31, which can be welded to one of the metal films provided in the coil element 3, the L-shaped housing contact current collector 29 has a plate-shaped region 35 on a second limb 33 protruding at right angles to said housing contact current collector 29. This plate-shaped region 35 has a width d, which approximately corresponds to the width of the inner dimension of the container 13. Peripheral regions 37 of the plate-shaped region 35 are bent back upward approximately through 90°.

Figure 3:
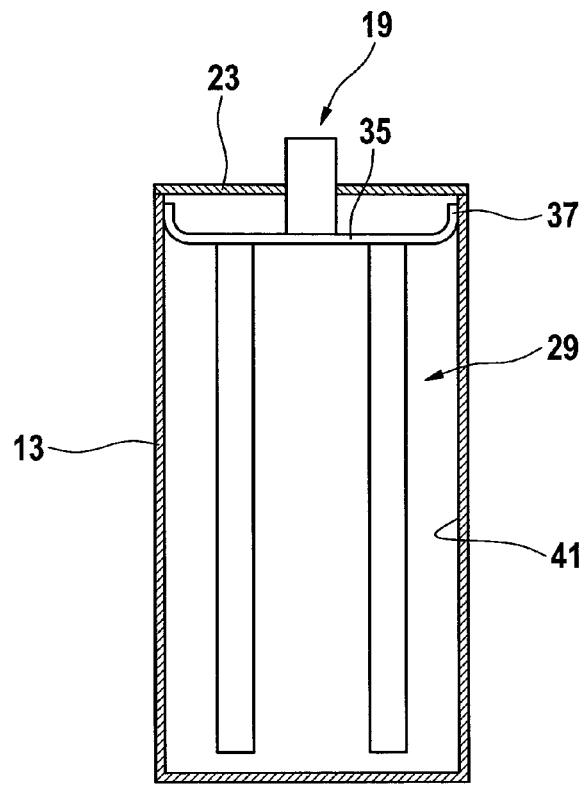
FIG. 3 shows a cross section through a battery cell in accordance with one embodiment of the present invention.

As illustrated in FIG. 3, the housing contact current collector 29 which has been introduced into a container 13, with the peripheral regions 37 of the plate-shaped region 35 bent back upward, comes into flat contact with an inner wall of the container 13. The peripheral regions 37 can in this case become stuck between opposite walls 41 of the container 13 and as a result stabilize the mechanical and electrical contact with the container 13.

Owing to the fact that the peripheral region 37 extends parallel to the inner wall 41 of the container 13 and can nestle against said inner wall, excessive surface pressure between the housing contact current collector 29 and the container 13 with which contact is made by said housing contact current collector is avoided so that local damage can largely be prevented.

Figure 4:
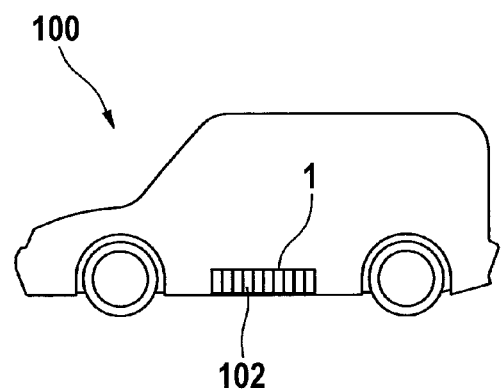
FIG. 4 shows a motor vehicle comprising a battery in accordance with one embodiment of the present invention.

FIG. 4 shows a motor vehicle 100 comprising a battery 102, which is assembled from a plurality of the above-described battery cells 1.

What is claimed is:

1. A battery cell comprising:
   a coil element comprising a wound stack comprising a copper film, coated with anode material, an aluminum film, coated with cathode material, and two plastic films acting as diaphragms,
   an electrolyte,
   a first current collector comprising copper, which is electrically conductively connected to the copper film,
   a second current collector comprising aluminum, which is electrically conductively connected to the aluminum film,
   a housing comprising a metallic container and a metallic cover arrangement, the container containing the coil element, the first current collector, and the second current collector,
   wherein the container has an opening, through which the coil element and the first and second current collectors can be introduced into the housing during manufacture of the battery cell,
   wherein the cover arrangement seals off the opening of the container in a gas-tight and pressure-tight manner,
   wherein a leadthrough arrangement is formed on the cover arrangement for passing through, in a gas-tight manner, electrically conductive contact arrangements, which are each in contact with a respective one of the first and second current collectors in an interior of the housing, out of the housing,
   characterized in that
   one of the first and second current collectors is in the form of a housing contact current collector and is arranged in direct mechanical and electrically conductive contact with the container,
   wherein the housing contact current collector has a plate-shaped region,
   wherein a surface of the plate-shaped region extends parallel to the cover arrangement, and
   wherein the plate-shaped region has a rim in mechanical and electrically conductive contact with an inner surface of the container.

2. The battery cell as claimed in claim 1, wherein the housing contact current collector is not in direct mechanical and electrically conductive contact with the cover arrangement.

3. The battery cell as claimed in claim 1, wherein the plate-shaped region has a width which corresponds to a width between two opposite walls of the container such that the housing contact current collector contacts each of the two opposite walls.

4. The battery cell as claimed in claim 1, wherein a peripheral region of the plate-shaped region of the housing contact current collector is bent back in a direction parallel to a side wall of the container, and wherein the peripheral region contacts each of the two opposite walls.

5. The battery cell as claimed in claim 1, wherein both the housing and the first and second current collectors are formed from a metal sheet, and wherein the metal sheet of the housing contact current collector has a different thickness than the metal sheet of the container.

6. The battery cell as claimed in claim 1, wherein the first and second current collectors are integral.

7. The battery cell as claimed in claim 1, wherein the housing has a prismatic form.

8. A motor vehicle comprising a battery cell as claimed in claim 1.

9. The motor vehicle as claimed in claim 8, wherein the housing contact current collector is in direct mechanical and electrically conductive contact with the container.

10. The motor vehicle as claimed in claim 8, wherein the housing contact current collector is not in direct mechanical and electrically conductive contact with the cover arrangement.

11. The motor vehicle as claimed in claim 8, wherein the housing contact current collector has a plate-shaped region, which extends parallel to the cover arrangement and which is in mechanical and electrically conductive contact at its rim, with an inner surface of the container.

12. The motor vehicle as claimed in claim 11, wherein the plate-shaped region has a width which corresponds to a width between two opposite walls of the container.

13. The motor vehicle as claimed in claim 11, wherein a peripheral region of the plate-shaped region of the housing contact current collector is bent back in a direction parallel to a side wall of the container.

14. The motor vehicle as claimed in claim 8, wherein both the housing and the first and second current collectors are formed from a metal sheet, and wherein the metal sheet of the housing contact current collector has a different thickness than the metal sheet of the container.

15. The motor vehicle as claimed in claim 8, wherein the first and second current collectors are integral.

16. The motor vehicle as claimed in claim 8, wherein the housing has a prismatic form.

17. The battery cell as claimed in claim 1, wherein the housing contact current collector is the first current collector, and wherein the second current collector is insulated from the housing.

18. The battery cell as claimed in claim 1, wherein the second current collector is insulated from the housing.

19. The battery cell as claimed in claim 1, wherein the housing contact current collector has two limbs that are welded to one of the copper film and the aluminum film of the coil element.

* * * * *